United States Patent
Gao et al.

(10) Patent No.: US 10,696,240 B2
(45) Date of Patent: Jun. 30, 2020

(54) DRIVE-BY CALIBRATION FROM STATIC TARGETS

(71) Applicant: Continental Automotive GmbH, Hannover (DE)

(72) Inventors: Lingjun Gao, Uckfield (GB); Heba Khafagy, Chiswick (GB); Dave Wibberley, Brighton (GB)

(73) Assignee: Continental Automotive GmbH (DE)

( * ) Notice: Subject to any disclaimer, the term of this patent is extended or adjusted under 35 U.S.C. 154(b) by 300 days.

(21) Appl. No.: 15/207,667

(22) Filed: Jul. 12, 2016

(65) Prior Publication Data

US 2017/0032526 A1    Feb. 2, 2017

(30) Foreign Application Priority Data

Jul. 29, 2015    (EP) .................................... 15178814

(51) Int. Cl.
*B60R 11/04* (2006.01)
*G06T 7/80* (2017.01)
(Continued)

(52) U.S. Cl.
CPC ................ *B60R 11/04* (2013.01); *G06T 7/13* (2017.01); *G06T 7/246* (2017.01); *G06T 7/50* (2017.01);
(Continued)

(58) Field of Classification Search
CPC ............... B60R 11/04; B60R 2300/307; B60R 2300/402; G06T 7/73; G06T 7/50;
(Continued)

(56) References Cited

U.S. PATENT DOCUMENTS 5,525,883 A * 6/1996 Avitzour .............. G05D 1/0274
  318/568.1
5,566,251 A * 10/1996 Hanna .................... H04N 5/272
  348/588
(Continued)

FOREIGN PATENT DOCUMENTS

DE    112014004506    7/2016
EP    1954063    8/2008
(Continued)

OTHER PUBLICATIONS

Japanese Office Action dated Sep. 16, 2016 for Japanese Application No. 2016-148274, 3 pages.
(Continued)

*Primary Examiner* — Brian P Yenke
*Assistant Examiner* — Sean N. Haiem
(74) *Attorney, Agent, or Firm* — RatnerPrestia

(57) ABSTRACT

A method for deriving extrinsic camera parameters of a vehicle camera. Calibration markers are provided on a flat ground surface and the vehicle is driven past the calibration markers. Marker boundaries are detected and matched to stored pre-determined shape parameters and a marker shape is identified. At least one extrinsic parameter of the camera is derived using the tracked positions of identified marker shape in the video sequence captured while vehicle is moving, wherein the extrinsic parameter is selected from mounting positions and a rotation is selected from both horizontal axis and vertical axis of a vehicle coordinate system.

14 Claims, 11 Drawing Sheets

(51) Int. Cl.
*G06T 7/73* (2017.01)
*G06T 7/13* (2017.01)
*G06T 7/50* (2017.01)
*G06T 7/246* (2017.01)

(52) U.S. Cl.
CPC .................. *G06T 7/73* (2017.01); *G06T 7/74* (2017.01); *G06T 7/80* (2017.01); *B60R 2300/307* (2013.01); *B60R 2300/402* (2013.01); *G06T 2207/10016* (2013.01); *G06T 2207/30204* (2013.01); *G06T 2207/30244* (2013.01); *G06T 2207/30252* (2013.01)

(58) Field of Classification Search
CPC .. G06T 7/13; G06T 7/246; G06T 7/80; G06T 7/74; G06T 2207/30252; G06T 2207/30204; G06T 2207/10016; G06T 2207/30244
USPC .......... 348/148, 588; 318/587; 382/103, 284
See application file for complete search history.

(56) References Cited

U.S. PATENT DOCUMENTS

| | | | |
|---|---|---|---|
| 2008/0031514 A1* | 2/2008 | Kakinami | G06T 7/80 382/154 |
| 2008/0181488 A1* | 7/2008 | Ishii | B60R 1/00 382/154 |
| 2009/0169052 A1* | 7/2009 | Seki | G06K 9/00805 382/103 |
| 2011/0216194 A1* | 9/2011 | Kosaki | H04N 7/18 348/148 |
| 2012/0007985 A1* | 1/2012 | Inui | H04N 17/002 348/148 |
| 2012/0121127 A1* | 5/2012 | Aoki | G06T 7/74 382/103 |
| 2013/0135474 A1 | 5/2013 | Sakano | |
| 2014/0046589 A1* | 2/2014 | Metzler | G01B 21/04 701/514 |
| 2014/0098229 A1* | 4/2014 | Lu | H04N 7/181 348/148 |
| 2014/0320658 A1* | 10/2014 | Pliefke | B60R 1/002 348/148 |
| 2015/0339920 A1* | 11/2015 | Cortelyou | G06K 9/00771 340/907 |
| 2016/0236619 A1* | 8/2016 | Tanaka | G06T 7/80 |
| 2016/0275683 A1* | 9/2016 | Sakano | G06T 7/80 |

FOREIGN PATENT DOCUMENTS

| | | |
|---|---|---|
| EP | 2858035 | 4/2015 |
| EP | 3032818 | 6/2016 |
| JP | 2005537583 | 12/2005 |
| JP | 2006250917 A | 9/2006 |
| JP | 2010244326 | 10/2010 |
| JP | 2013115540 | 6/2013 |
| JP | 2015035685 | 2/2015 |
| JP | 2015070512 | 4/2015 |
| KR | 20150028532 | 3/2015 |
| WO | 2004023783 | 3/2004 |
| WO | 2009027090 | 3/2009 |
| WO | 2009142921 | 11/2009 |

OTHER PUBLICATIONS

Korean Office Action dated Oct. 20, 2016 for Korean Application No. 2016-0096416, 9 pages.
Extended European Search Report dated Feb. 12, 2016 for European Application No. 15178814.8-1906, 5 pages.
Notification of Reasons for Refusal for Japanese Application No. 2016-148274, dated Feb. 14, 2017, including English translation, 6 pages.

* cited by examiner

DRIVE-BY CALIBRATION FROM STATIC TARGETS

CROSS REFERENCE TO RELATED APPLICATIONS

This application claims priority to European Patent Application No. EP15178814, filed Jul. 29, 2015, the contents of such application being incorporated by reference herein.

FIELD OF THE INVENTION

The present specification relates to a camera calibration of a vehicle camera and in particular to a camera calibration using static targets on the ground plane.

BACKGROUND OF THE INVENTION

Increasingly, passenger vehicle are equipped with cameras. The cameras can provide many assistance functions to the driver such as lane keeping, parking aid, detection of obstacles and other objects, emergency braking, reconstruction of accidents and other events, monitoring of the traffic and weather situation, recording of driving patterns, deriving speed and position of the car, vehicle detection and collision avoidance, detection of traffic signs, lighting adjustment, night vision and more.

These functions require image processing, which can be provided by processing units in the cameras or dedicated processing units in the car. The processing units are connected to further devices, such as screens, indicators, the engine control unit, etc.

SUMMARY OF THE INVENTION

For an accurate representation of the vehicle surroundings, a camera calibration is required. The camera calibration comprises the calibration of intrinsic parameters, such as focal length and lens distortion, and of extrinsic parameters such as camera placement and orientation.

In particular, an aspect of the present specification discloses a method for an extrinsic calibration of a single camera or of a multi-camera system according to the present specification. A calibration method according to the application does not require
- a precise placement of the vehicle
- a dedicated static vehicle time for calibration
- a large surface area within a factory, although these conditions may be provided, if necessary.

The calibration method can be performed inside or outside the factory. For example, the calibration may be performed in the garage of a workshop or on a dedicated place, which has appropriate markings on a ground surface.

A calibration method according to an aspect of the present specification can provide
- a short calibration time
- flexible driving condition requirements
- independence of the ground surface as long as the surface is flat enough, while providing a sufficiently accurate calibration.

In a method according to an aspect of the present specification, a vehicle is driven over a set of predetermined patterns or markers on the ground. Cameras, which are mounted on the vehicle, record images of those patterns. One or more computation units calculate the appropriate extrinsic parameters for all cameras.

The extrinsic parameters relate the camera coordinate system to a world coordinate system. This can be done by a rotation and a translation, for example.

The patterns, which are also referred to as "calibration targets" or "calibration markers", are not necessarily aligned parallel to each other. When the vehicle is driving towards the targets, one or more targets are detected, identified and tracked in the captured video sequence. The calculation of extrinsic camera parameters is based on multiple frames of the captured video sequence.

According to a main embodiment, extrinsic camera parameters, which include the rotations about the x, y and z axis of a vehicle coordinate system and the mounting height in the vehicle coordinate system are optimised at the same time and the vehicle cameras are calibrated individually. In particular, there may be four vehicle cameras.

The properties of a calibration method according to the present specification can also be summarized according to the following lists:
- the calibration patterns do not need to be aligned,
- no other information from the vehicle is needed such as speed, steering, GPS location . . .
- intrinsic parameters are not calculated, in fact they are one of the inputs of the method.

1. The marker shapes are pre-determined, and are already stored according to the method. Only the following input is required:
- the input from the camera(s) (sequence of Images)
- the camera intrinsics (which are a given to the camera when it is manufactured)
- the estimated camera mounting position (their placement on the vehicle, in particular, the X and Y positions)

2. A sequence of images from the camera on a moving vehicle is used.

3. The patterns are not provided by road markings but by predefined specific patterns.

4. a preferred method for providing the patterns is painting the patterns (for fixed usage like in a factory) or having them pre-printed on boards that are portable (for more flexibility, for example for use in garages).

The computation unit makes use of a known true size of the patterns, wherein the size refers to the outer boundaries of the patterns. Furthermore, the patterns may comprise a sub-structure or sub-pattern, such as a checkerboard pattern.

In particular, the present application discloses a method for deriving extrinsic camera parameters of at least one vehicle camera.

One or more pre-determined calibration markers are provided on a flat ground surface. A pre-determined set of shape parameters, which correspond to the calibration markers is stored in a computer readable memory of the vehicle. In a broader sense, a stored vector graphic of the marker is also regarded as shape parameters. The shape parameters characterize the calibration markers. For example, a radius can characterize a circular marker and a cross diagonal length or a side length can characterize a square shaped marker.

The vehicle is driven past the one or more pre-determined calibration markers and the calibration markers are captured by the vehicle camera or by the vehicle cameras. According to another embodiment, the vehicle remains stationary while the images are captured. Image data is received from the at least one vehicle camera and processed in a computation unit of the camera and/or in a computation unit of the vehicle. The image data that is relevant for the present method comprises calibration marker images. The marker images are digital representations of a sensor signal corresponding to the marker or to a portion of the marker.

The portion of the image data, which comprises calibration marker images is also referred to as "calibration marker image data". The expressions "image data", "calibration marker image" and "calibration marker image data" may refer to the digitized raw image data of the sensor or to processed data. Among others, the image processing may include a reduction of distortions, providing a top-down projection, a noise reduction, or a compensation for properties of the sensor elements.

The computation unit detects marker boundaries of the one or more calibration marker imagers in image frames of the image data and matches the detected marker boundaries to the pre-determined shape parameters. The computation unit identifies one or more calibration markers. In one realization, the markers are identified by identifying the shapes of the calibration markers. The shapes of the markers are identified by comparing the apparent shape of the calibration markers with the stored shape parameters The identified calibration markers in the video sequence are tracked while the at least one vehicle camera is moving, and at least one extrinsic parameter of the at least one vehicle camera is determined using the positions of the identified calibration markers in the captured video sequence.

In one embodiment, the calibration markers are provided with an optical recognition symbol, which identifies the type of the marker. A computation unit can then already identify the marker shape by identifying the recognition symbol. Among others, the optical recognition symbols may differ in colour, number or arrangement. For example, a square marker may be provided with a red dot and a rhombohedric marker with a blue dot or they may be provided with different numbers and/or positions of dots. Alternatively or in addition, the marker shape can be identified by the outer maker boundary, a marker pattern or by other characteristic optical features.

In one embodiment, the optical recognition symbol also allows to detect the alignment of the marker, for example by providing a cross shaped or an arrow shaped optical recognition symbol on the marker or by providing an internal pattern, such as a checker board pattern.

Specifically, the derived extrinsic parameters comprise a rotation or tilt around a first horizontal axis or x-axis of a vehicle coordinate system, also known as pitch rotation, a rotation around a second horizontal axis or y-axis, also known as a roll rotation, a rotation around a vertical axis or z-axis, also known as yaw rotation, and a mounting height with respect to the vehicle coordinate system.

The vehicle coordinate system refers to a fictitious rectangular coordinate system or frame of reference, which is fixed to the vehicle. The horizontal axes are parallel to the ground plane and aligned along the principal axes of the car while the vertical axis points upward and is orthogonal to the horizontal axes.

According to one choice of vehicle coordinate system, the horizontal plane of the vehicle coordinate system is aligned with the ground plane, the x-axis is parallel to the front axis and the coordinate original is at a left end of the front axis. According to another choice, the coordinate origin is the projection of the center of mass to the ground plane or the projection of a geometrical centre point to the ground plane.

In one particular embodiment, the method comprises identifying a first set of at least two parallel straight marker boundaries in the image of one of the one or more pre-determined calibration markers and identifying a second set of at least two parallel straight marker boundaries in the image of one of the one or more pre-determined calibration markers. The marker boundaries are selected such that the second set of marker boundaries is not parallel to the first set of marker boundaries. The second set of marker boundaries and may correspond to an image of the same or of a different marker.

The computation unit derives an orientation of the at least one vehicle camera with respect to the ground plane from the first set and the second set of marker boundaries.

The two sets of parallel lines converge on two vanishing points which are on the horizon, which is the vanishing line connecting the two vanishing points. This in turn provides the tilt of the camera with respect to the ground plane. The tilt provides the camera rotations about the horizontal x and y axes of the vehicle coordinate system.

According to another embodiment, a camera tilt against the vertical is determined from the perspective foreshortening of the image of the markers on the sensor surface of the vehicle camera. According to this embodiment, a perspective foreshortening of an image of at least one marker is derived from the matching of the detected marker boundaries to the pre-determined shape parameters and an orientation of the at least one vehicle camera with respect to the ground plane is derived based on the derived perspective foreshortening.

By way of example, a marker image of a circular marker appears as an oval. The degree of ellipticity and the direction of the principal axes of the ellipse give the amount and the direction of tilt. For a triangularly shaped marker, the three angles can be compared with the corresponding angles of the triangular marker, which are stored as shape parameters in the computer readable memory. Thereby, a tilt of the camera is derived. The same or a similar method can also be applied to determine a perspective foreshortening of a polygon shaped marker. By way of example, the polygons may be decomposed into triangles and the angles of the triangles or the angles between the outer marker boundaries can be compared to corresponding stored angles of the calibration markers.

In order to increase the accuracy, this estimate can be repeated for different images of calibration markers and/or for different image frames of an image sequence and the estimate can be obtained as a weighted average of the individual estimates. If an accuracy of an estimate is considered insufficient, it can be given a weight of zero in the weighted average.

In one embodiment, the marker boundaries comprise a boundary of an internal pattern of one of the one or more pre-determined calibration markers, in another embodiment, the marker boundaries comprise an outer boundary.

In particular, the sets of parallel marker boundaries or the perspective foreshortening can be used to determine a rotation around the first or the second horizontal axis from the derived orientation of the camera with respect to the ground plane.

According to a further embodiment, the method also comprises deriving a magnitude of a shape parameter in a calibration marker image at least one of the one or more calibration markers, such as an apparent border length, an apparent cross diagonal length, a surface area, or a length of a principal axis. The magnitude of the shape parameter, which provides a measure for the apparent size of the marker, is compared with a magnitude of a corresponding stored shape parameter, and a mounting height of the at least one camera is derived from the comparison of the magnitudes.

In particular, the magnitude of the shape parameter, or the apparent size of the marker in the calibration marker image allows determining a distance d of the marker from the vehicle camera. When the tilt α of the camera against the vertical is known, for example by using the abovementioned method or otherwise, then the mounting height Z of the camera with respect to the ground surface can be derived as $Z=d*\cos(\alpha)$.

According to a further embodiment, the method comprises deriving a magnitude of a shape parameter of an image of one of the one or more calibration markers from image data, or from an image frame, of a first vehicle camera. The size parameter is indicative of the size of the calibration marker image on the image sensor.

By comparing the size parameter with a stored size parameter, a computation unit derives a distance between the first vehicle camera and the corresponding calibration marker, which corresponds to the calibration marker image. Furthermore, the computation unit derives a magnitude of a shape parameter of a calibration marker image, which corresponds to the same calibration marker, from image data or from an image frame, of a second vehicle camera. By comparing the size parameter with a stored size parameter, a distance between the second vehicle camera and the corresponding calibration marker is derived.

By using the first distance and the second distance a position of the calibration marker on the ground surface with respect to a vehicle coordinate system is derived.

A rotation of the first vehicle camera around the vertical axis is derived from the derived position of the calibration marker. Furthermore, a rotation of the second vehicle camera around the vertical axis is derived from the derived position of the calibration marker.

According to a further modification of the method, the method comprises deriving a rotation of the first or of the second vehicle camera around the first horizontal axis or around the second horizontal axis by using the derived position of the corresponding calibration marker.

The accuracy may be improved by computing a weighted average of the estimates of the external parameters. By way of example, the image data may comprise two or more calibration marker images. The computation unit derives a camera orientation of the at least one camera for each of the two or more calibration marker images and computes an average camera orientation as a weighted average of the derived camera orientations of the at least one camera.

The calibration markers may be provided in various ways. In particular, they can be provided by painted surfaces or by one or more portable boards.

In a further aspect, the current specification discloses a computer program product for the execution of the abovementioned method, which may be provided on a storage medium such as an optical medium, a magnetized medium, a ferroelectric medium, or in a memory of an integrated circuit/ASIC, on an EPROM etc. Furthermore, the current specification comprises a computer readable storage medium, which comprises the computer program product.

In a further aspect, the current specification discloses a computation unit, such as one or more computation units of vehicle cameras, a centralized computation unit for connection to the surround view cameras or a combination thereof. In particular, the vehicle cameras can be part of a surround view system, which provides a top down projection of a street surface.

The computation unit comprises an electronic computing means such as a microprocessor, an IC or and ASIC, a computer readable memory with pre-determined shape parameters of a set of pre-determined calibration markers, and a connection for receiving image data from one or more vehicle cameras. The image data comprises calibration marker image data.

By providing stored executable instructions and/or corresponding electronic components for digital and/or for analog data processing the computation unit is operative to detect marker boundaries in one or more calibration marker images from the image data and match the detected marker boundaries to the pre-determined shape parameters.

The computation unit tracks the one or more identified calibration markers in the video sequence while the at least one vehicle camera is moving and derives at least one extrinsic parameter of the at least one vehicle camera using the positions of the one or more identified calibration markers in the captured video sequence.

Among other, the extrinsic camera parameter can be selected from a rotation around a first horizontal axis, a rotation around a second horizontal axis, a rotation around a vertical axis, or Z-axis, of a vehicle coordinate system, and a mounting height with respect to the vehicle coordinate system.

In a further embodiment, the computation unit is furthermore operative to derive a relative orientation of at least one vehicle camera with respect to an orientation of corresponding calibration markers on a ground surface, which correspond to the calibration marker images.

Furthermore, the current specification discloses a kit with the computation unit and one or more vehicle cameras, and a vehicle in which the kit is installed. The one or more vehicle cameras are mounted to pre-determined positions of the vehicle and are facing to the exterior of the vehicle. The computation unit is electrically connected to the one or more vehicle cameras.

The markers do not have to be aligned in a pre-determined orientation or layout pattern with respect to each other, although they may have a pre-determined relative orientation or layout pattern, which can be used in a feature detection and matching.

Due to perspective foreshortening some marker boundaries are projected to fewer image pixels than others and are therefore less suitable to derive an orientation of the marker boundary. When the markers are laid out in random orientation, it may result in a higher likelihood to find a marker boundary, which has a suitable orientation with respect to a vehicle camera. Moreover, the patterns can be laid out conveniently and quickly when the relative distances and orientations do not need to be fixed in advance. This feature can be advantageous in the garage of a workshop and can help the motor mechanics to save time.

When the vehicle drives past the markers, the subsequent image frames provide different view of the markers. This also increases the likelihood that a particular view of a given marker of a particular image frame is suitable for determining a camera orientation or mounting height.

Differently shaped markers can be used to enhance the likelihood to find marker boundaries that are suitable for image recognition. For example, the markers may vary with respect the number of straight outer boundaries, the length of the boundaries and the surface area. Some markers may be more suitable for determining a size of the marker. Marker shapes include, among others, a square shape, a rectangular shape, a rhombohedral shape, a triangular shape, an equilateral triangle shape, a right triangle shape, and a circular shape. Regular polygons or polyhedral with more than four sides may also be used as marker shapes.

The marker boundaries can be used for determining a vanishing line and thereby deriving a tilt of the vehicle cameras with respect to the ground plane. Since all markers are arranged on the ground plane, the extension of the marker boundaries end in vanishing points, which are approximately on the same vanishing line.

According to further embodiments the markers are provided in uniform white colour, or in any other uniform colour, and the patterns could comprise colours other than white or black. The markers 21 to 27 can be provided as pre-defined markers on any flat surface or a dedicated calibration surface. In particular, the markers 21 to 27 can be provided by painting, for example for a factory calibration, or as pre-printed pattern portable boards, for example for a calibration in a workshop garage.

According to one embodiment, an image evaluation unit estimates the dimensions of the markers using information such as the distances of the cameras to the ground plane, the orientation of the cameras relative to a vertical axis, the orientation of the car relative to the markers in the horizontal x-y plane and the speed of the car.

If the markers are provided as customized markers, the markers may be provided as physical markers on the ground surface, such as: using temporary portable patterns or disposable stickers or by painting them on the road surface such as using paint or paint with reflecting particles or components.

BRIEF DESCRIPTION OF THE DRAWINGS

The subject of the present specification is now explained in further detail with respect to the following Figures in which.

DETAILED DESCRIPTION OF THE PREFERRED EMBODIMENTS

In the following description, details are provided to describe the embodiments of the present specification. It shall be apparent to one skilled in the art, however, that the embodiments may be practised without such details.

Figure 1:
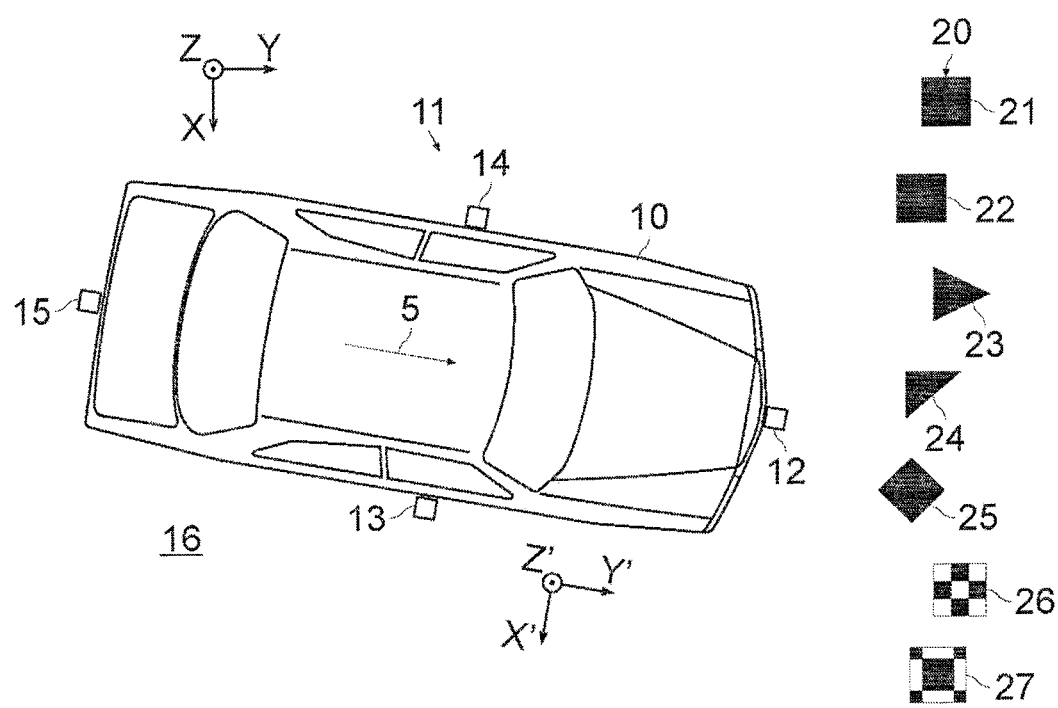
FIG. 1 shows a vehicle with a surround view system driving past a first set of markers on a ground plane.
Figure 2:
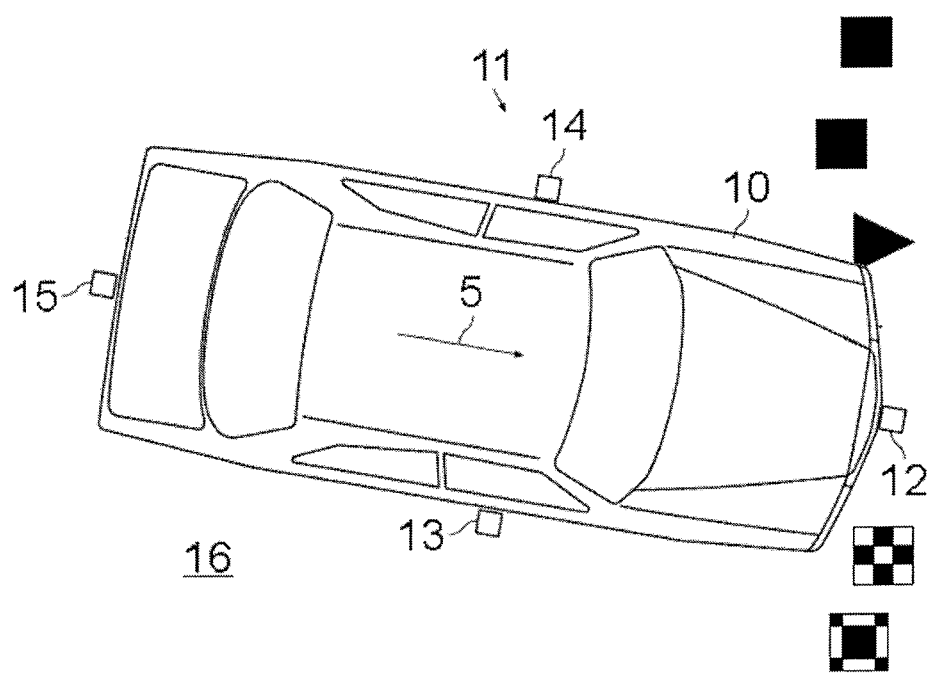
FIG. 2 shows the set of markers of FIG. 1 while the vehicle of FIG. 1 is in a second position.
Figure 3:
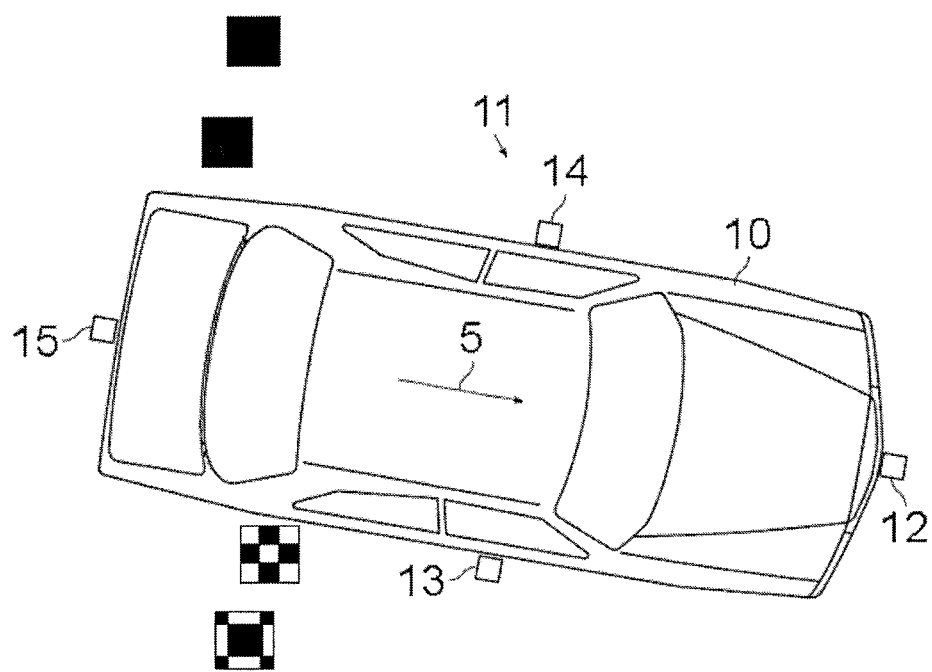
FIG. 3 shows the set of markers of FIG. 1 while the vehicle of FIG. 1 is in a third position.

FIGS. 1 to 3 show the relative position of a set of markers 21-27 to a car 10 while the car 10 drives over the markers and 21-27, and an optical recognition system of the car takes a video sequence using one or more of the vehicle cameras 12, 13, 14, 15.

FIG. 1 shows a car 10 with a surround view system 11. The surround view system 11 comprises a front view camera 12, a right side view camera 13, a left side view camera 14 and a rear view camera 15. The cameras 12-15 are connected to a CPU of a controller, which is not shown in FIG. 1.

In FIG. 1, a world coordinate system is indicated by coordinates X, Y, Z and a vehicle coordinate system is indicated by coordinate system X', Y', Z'. The vehicle coordinate system X', Y', Z' is aligned with the vehicle and is attached to the vehicle, such as the centre of gravity, the centre of the front axis or the projection of those points to the ground surface. Likewise, the world coordinate system X, Y, Z is attached to a point in the surroundings, such as for example the location and orientation of the vehicle coordinate system at a time t_0.

The orientation and placement of the coordinate system is provided by way of example and may be chosen differently. For example, the Z-axis may also point downwards, as shown in FIG. 4.

FIG. 1 shows a situation in which a car 10 drives past or over a set of calibration targets or markers 21 to 27, which are arranged on a ground plane 16. An arrow 5 indicates a heading and velocity of the vehicle 10. In the embodiment of FIG. 1, the markers 21 to 27 are defined by their boundaries 20. The markers 21 to 25 are filled out in a uniform black colour while the markers 26 and 27 comprise black and white patterns. The colour may comprise reflective particles.

As indicated in FIG. 1, the direction 5 in which the car drives does not need to be aligned with the markers. Even if the relative orientation of the car towards the markers is not known, it is still possible to determine the relative orientation of the four cameras in the horizontal x-y plane and the tilting of the cameras relative to the vertical z-axis.

Figure 4:
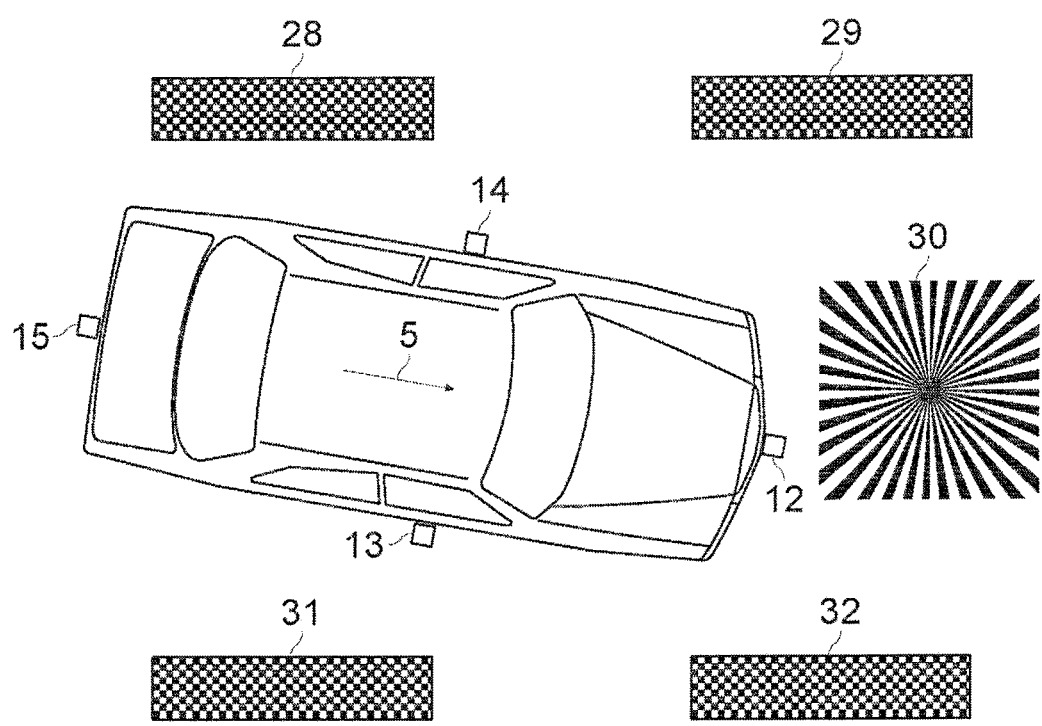
FIG. 4 shows a vehicle with a surround view system driving past a second set of markers.

FIG. 4 shows the vehicle 10 driving past a second calibration pattern on the ground surface 16. Different from the markers of FIG. 1, the markers of FIG. 4 comprise a first type of markers 28, 29, 31, 32 with a checkerboard calibration pattern and a second type of markers 30 with a radial or star shaped calibration pattern.

Figure 5:
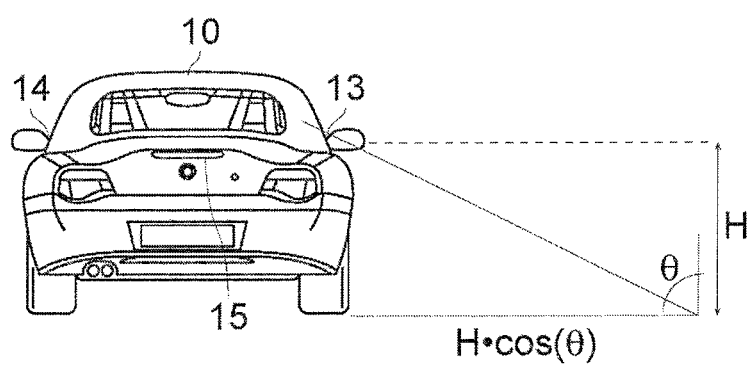
FIG. 5 illustrates a projection to the ground plane.
Figure 6:
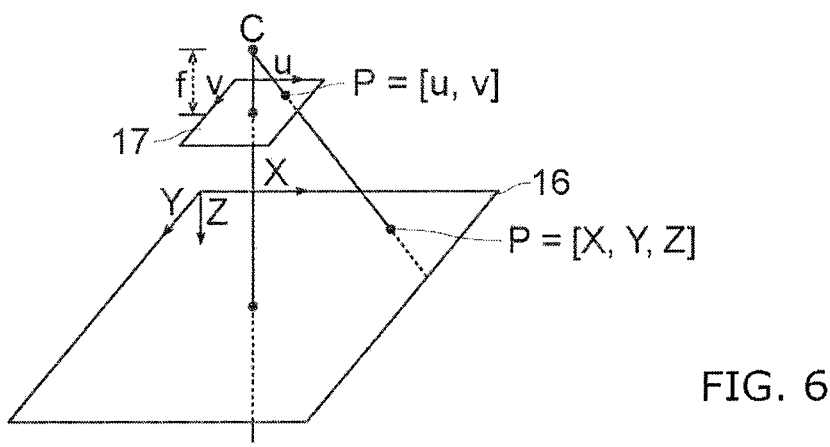
FIG. 6 illustrates in further detail the projection to the ground plane.

FIGS. 5 and 6 illustrate a top-down projection or projection to a ground plane.

FIG. 5 shows a side elevation in which the right camera 13 is used to perform a ground plane projection. If the camera is positioned at a height H above ground, a projection that extends over an angle θ corresponds to a stretch H*cos(θ) of the ground surface.

FIG. 6 shows a view port plane and a ground plane. FIG. 6 refers to a top-down view, in which the ground plane is parallel to the view port plane. In general, the ground plane can be tilted with respect to a plane of the camera sensors, which is also referred to as image plane. The top-down view of FIG. 6 is obtained by deriving a camera orientation relative to the vertical axis and rotating the image plane such that it is parallel with the ground plane.

A point in a view port plane 17 is denoted by p=(u, v) and a corresponding point in the ground plane 16 is denoted by P=(X, Y). A distance between the view port plane 17 and a projection centre C is denoted by the letter "f".

In the surround view system of FIG. 1, the top-down views of the individual cameras are merged to obtain a top-down view of the surroundings of the car, which is similar to a top-down view that would be generated by a camera that is positioned above the car and aligned parallel to the ground surface.

By way of example, the merging of the images of the individual cameras can be performed by using known fields of view of the cameras and known or derived orientations of the cameras and/or by identifying corresponding features in the images of the individual cameras.

Figure 7:
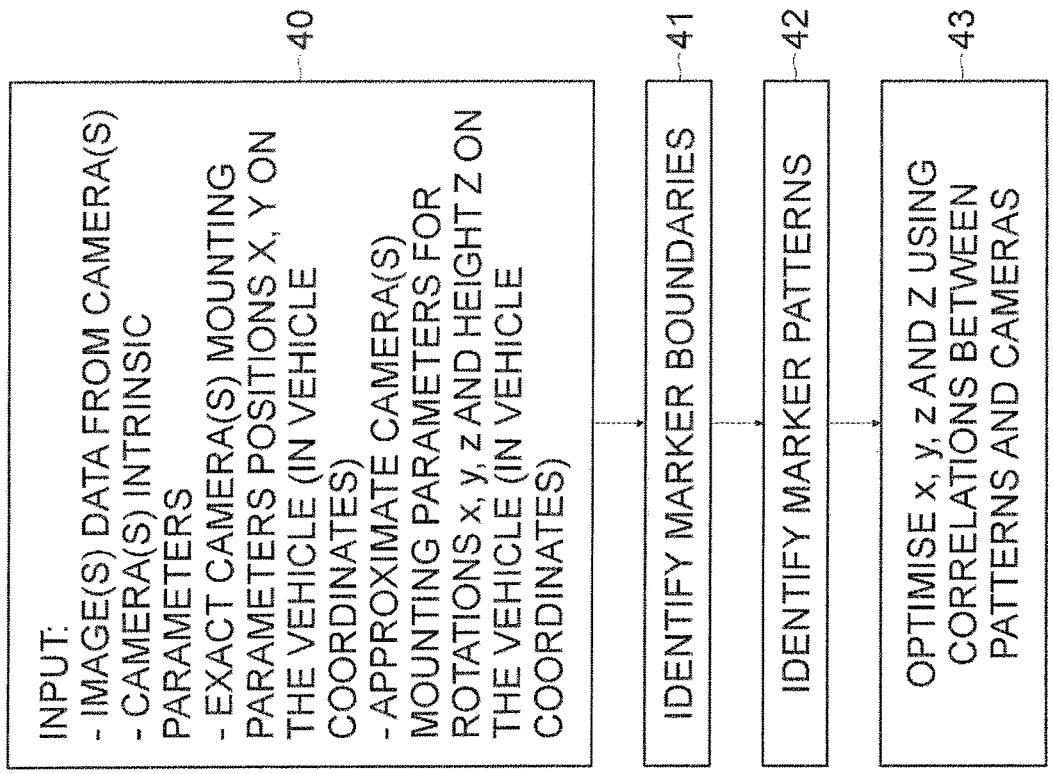
FIG. 7 shows a procedure for determining external camera parameters using the markers of FIG. 1 or FIG. 4.

FIG. 7 shows a camera calibration of extrinsic camera parameters with an arrangement of calibration markers according to the present specification. FIGS. 1 and 4 provide examples for such arrangements. However, the arrangement of calibration markers is not limited to the embodiments of FIGS. 1 and 4.

An automatic determination of extrinsic camera parameters links a camera coordinate system to a world coordinate system, by using an arrangement of calibration markers according to the present specification.

In a step 40, image data is acquired from the cameras are processed. In a step 41, marker boundaries are identified, for example by using peaks of a Hough transform and/or clustering of points on a unit sphere onto which points (u, v) of the viewport are projected. The identified boundaries of the markers are compared with marker boundaries according to stored shape parameters of the pre-defined markers.

The shape parameters of the pre-determined markers are stored in a computer readable memory, which may be provided, among others, by a memory of the vehicle cameras, as an external memory of the vehicle cameras or as a memory of a computation unit that is connected to the vehicle cameras.

In a step 42, patterns of the markers are identified and, if the marker comprises a pattern, the identified pattern is compared with stored shape parameters of the pre-defined pattern. If a matching pre-determined marker is found, which corresponds to the marker boundaries and, if present, to the pattern, the corresponding pixels of the image are identified as pixels of the pre-determined marker.

In a step 43, the mounting heights Z and the vertical orientations x, y, z of the cameras are determined using the pre-determined shapes and sizes of the markers and the marker patterns.

Figure 10:
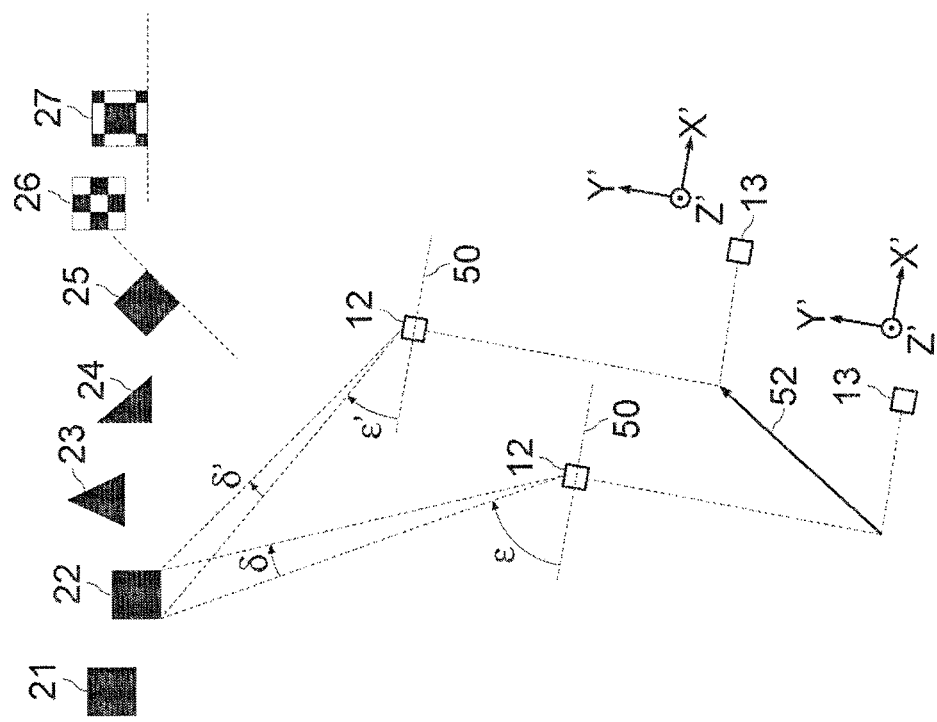
FIG. 10 illustrates a procedure for determining a translation of the vehicle.
Figure 11:
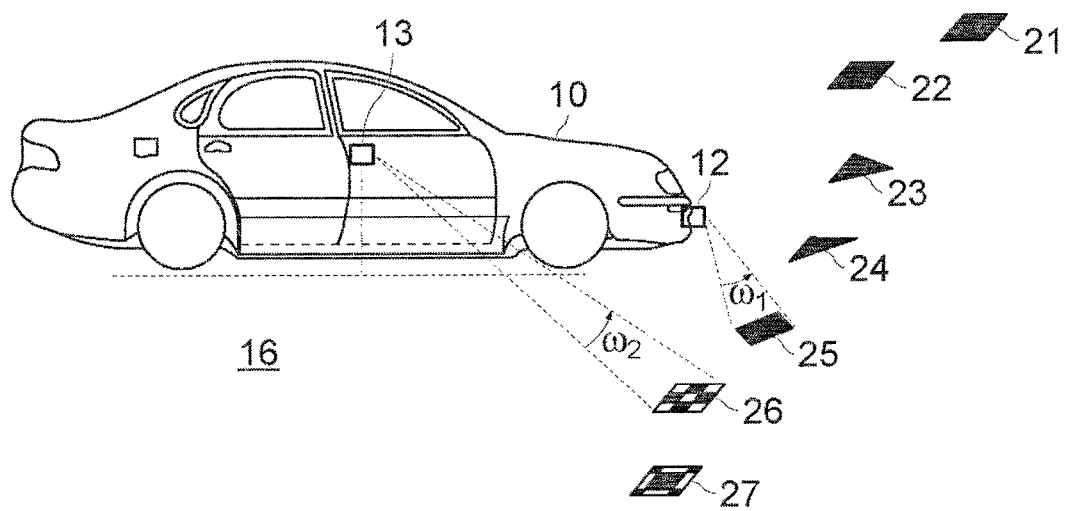
FIG. 11 illustrates a procedure for determining vertical camera orientations based on marker sizes.
Figure 12:
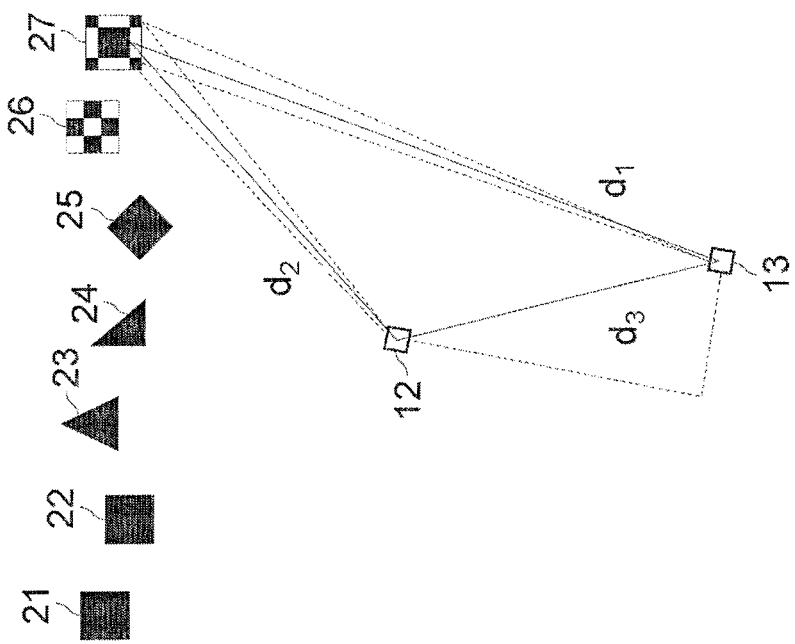
FIG. 12 illustrates a procedure for determining horizontal and/or vertical camera orientations based on marker sizes.

FIGS. 8 to 11 provide examples of carrying out the step 42, while FIG. 12 provides an example of carrying out step 43.

Figure 8:
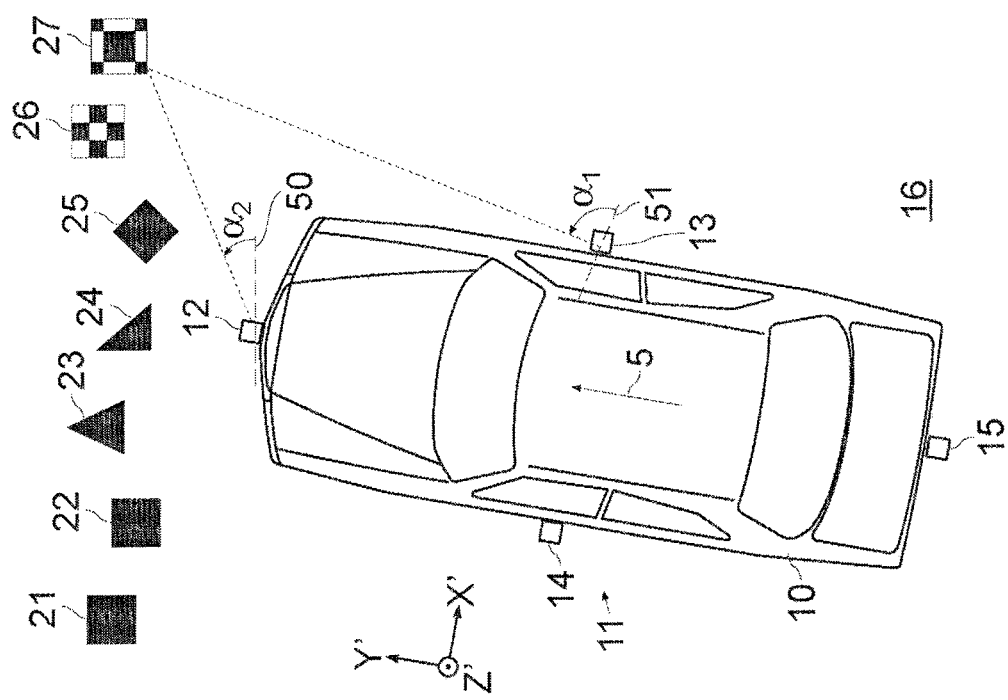
FIG. 8 illustrates a first procedure for determining horizontal camera orientations.

In FIG. 8, a first dashed line 50 indicates an orientation of a sensor plane of the front camera 12 in the horizontal X-Y plane and a second dashed line 51 indicates an orientation of a sensor plane of the right camera 13 in the horizontal X-Y plane.

By way of example, a connecting line from a front left corner of the pattern 27 to the front camera 12 is inclined by an angle $\alpha_2$ with respect to the sensor plane 50 of the front camera and a connecting line from the front left corner of the pattern 27 to the right camera 13 is inclined by an angle $\alpha_1$ with respect to the sensor plane 51 of the right camera 13.

According to one embodiment, the relative orientation of the sensor planes 50, 51 in the horizontal plane is determined by computing the difference between the angles $\alpha_1$ and $\alpha_2$. This estimate can be improved by using multiple reference points of multiple patterns and computing an average, as well as by using reference points from multiple image frames instead of using reference points from just one image frame.

According to one embodiment, an absolute orientation of the cameras 12, 13, 14, 15 in the horizontal X-Y plane is established by comparison with a reference camera, which has a known orientation. The reference camera may be provided at a location where it is less likely to receive shocks that can change the camera orientation, such as behind the windscreen of the vehicle.

Figure 9:
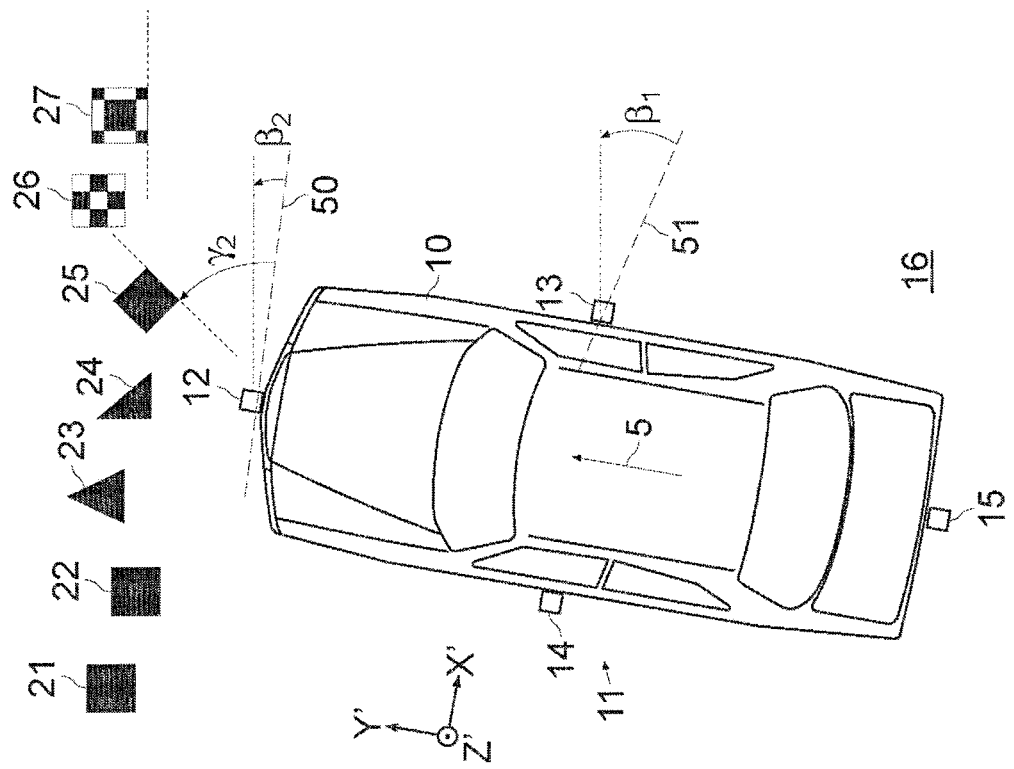
FIG. 9 illustrates a second procedure for determining horizontal camera orientations.

FIG. 9 shows a second method, in which an orientation of straight lines of the patterns 21 to 27 is used to determine an orientation of the cameras 12, 13, 14, 15 in the horizontal X-Y plane. The straight lines may be provided by the marker boundaries or also by straight lines of internal patterns of the markers.

By way of example, a right front boundary of pattern 25 is inclined at an angle $\gamma_2$ with respect to the sensor plane 50 of the front camera 12 and a front boundary of pattern 27 is inclined at an angle $\beta_2$ with respect to the image sensor plane of the front camera 12.

Furthermore, the front boundary of pattern 27 is inclined at an angle $\beta_1$ with respect to the image sensor plane of the right camera 13. In the example of FIG. 4, the markers are aligned in parallel and with a pre-determined distance with respect to each other. The pre-determined parallel alignment and distance can be used to derive the extrinsic parameters of the camera. In this case, the relative orientation of the markers and/or their relative distances are also stored in the computer readable memory of a computation unit.

FIG. 10 shows a method of determining a translation 52 of the vehicle 10. By way of example, a front surface of the pattern 22 extends over an angle δ in a first position of the vehicle 10 and over an angle δ' in a second position of the vehicle 10. A connecting line from a front left corner of the pattern 22 to the front camera 12 appears under an angle ε in the first position and under an angle ε' in the second position.

For a straight motion of the vehicle 10, as shown in FIG. 10, the border lines of the patterns 25, 27 appear under the same angle relative to the sensor planes 50, 51 of the cameras 12, 13.

The derived motion of the vehicle 10 can then be used to improve an estimate of the extrinsic camera parameters and in particular to improve an estimate of the camera orientations.

FIG. 11 illustrates a method for estimating an inclination of the cameras relative to the vertical. A cross diagonal of the pattern 26 appears under an angle $\omega_2$, when viewed from the right camera 13, and a cross diagonal of the pattern 25 appears under an angle $\omega_1$ when viewed from the front camera 12. Using the apparent size of the pattern diagonal of the pattern 26, a distance d between the camera 13 and the pattern 26 is derived. By using the known elevation Z of the camera 13, an angle φ under which the pattern appears against the vertical is derived as φ=arcsin (Z/d).

The angle φ is compared with an angle between a connecting line of the pattern to the camera 13 and the sensor plane of the camera 13. Thereby, a tilt of the sensor plane of the right camera 13 against the vertical or against the horizontal is determined. This estimate can be improved by using boundary lines of multiple markers, by using multiple frames or by using more shape parameters of the markers such as using both cross diagonals, using internal patterns of the markers etc.

In particular, the tilt of the sensor plane can be obtained by computing a weighted average of the derived tilt angles from the patterns, shape parameters and patterns of multiple image frames. In one embodiment, the weights of the weighted average are adjusted according to an estimated accuracy of the estimates, wherein less accurate estimates have a smaller weight. For example, the accuracy of a tilt angle estimate is generally less for an estimate that is based on a marker which is positioned further away from the camera.

FIG. 12 illustrates a further method of determining horizontal and/or vertical camera orientations based on marker sizes. By way of example, the front boundary of the marker 27 extends over an angle $\omega_1$ when viewed from the front camera 12 and extends over and angle $\omega_2$ when viewed from the right camera 13. The respective distances $d_1$ and $d_2$ of the marker 27 from the front camera and the right camera are computed by using the angles $\omega_1$, $\omega_2$ and the stored real size and shape of the markers as input values. Furthermore, the distance $d_3$ is computed using the known camera positions on the vehicle.

Thereby, all three angles of the triangle, which is formed by the front camera 12, the marker 27 and the right camera 13, are known. Furthermore, the elevations of the front camera 12, the right camera 13 and the marker 27 are also known. This in turn allows to determine the orientation of the triangle in three dimensions.

By using the dimensions of the calibration markers and the orientation of the triangle, the horizontal and vertical camera orientations, or the orientations of the respective camera sensor planes, can be derived. For enhanced accuracy, this procedure can be repeated for multiple markers, multiple frames and for different shape parameters of the individual markers, such as the cross diagonals, the front and the rear boundaries, etc.

REFERENCE NUMBER LIST 10 vehicle
11 surround view system
12 front camera
13 right camera
14 left camera
15 rear view camera
16 ground plane
21-27 markers
28-32 markers
40-48 method steps
50 sensor plane
51 sensor plane
52 translation

The invention claimed is:

1. A method for deriving extrinsic camera parameters of at least one vehicle camera, comprising:
   providing separate calibration markers having respective perimeters in a shape that is common between the separate calibration markers, the separate calibration markers manually placed at random locations and random orientation angles with respect to the respective perimeters on a ground surface relative to each other and relative to the placement of the vehicle,
     storing, by a computer readable memory of the vehicle, pre-determined shape parameters corresponding to each of the separate calibration markers,
     receiving, by a processor of the vehicle, image data from the at least one vehicle camera, the image data comprising a video sequence, the video sequence comprising calibration marker image data captured over a period of time while the vehicle is driven towards and over at least one of the separate calibration markers,
   detecting, by the processor of the vehicle, marker boundaries in the image data,
   matching, by the processor of the vehicle, the detected marker boundaries to the pre-determined shape parameters,
   identifying, by the processor of the vehicle, the separate calibration markers,
   tracking, by the processor of the vehicle, the identified separate calibration markers in the video sequence captured over the period of time while the vehicle is driven towards and over at least one of the separate calibration markers,
   deriving, by the processor of the vehicle, at least one extrinsic parameter of the at least one vehicle camera using the positions of the identified separate calibration markers in the video sequence captured over the period of time while the vehicle is driven towards and over at least one of the separate calibration markers, the at least one extrinsic parameter of the at least one vehicle camera including at least one rotation about at least one axis, and
   calibrating the at least one vehicle camera by adjusting the at least one rotation to attain an optimum rotation about the at least one axis.

2. The method according to claim 1, wherein the marker boundaries comprise a boundary of an internal pattern of a calibration marker image.

3. The method according to claim 1, comprising:
   deriving a perspective foreshortening of a calibration marker image from a matching of detected marker boundaries to the pre-determined shape parameters, and
   deriving an orientation of the at least one vehicle camera with respect to the ground plane from the derived perspective foreshortening.

4. The method according to claim 1 comprising:
   deriving an orientation of the at least one vehicle camera with respect to the ground plane from the at least one extrinsic parameter, and
   deriving a rotation around a first horizontal axis from the derived orientation of the camera with respect to the ground plane.

5. The method according to claim 1 comprising:
   deriving an orientation of the at least one vehicle camera with respect to the ground plane from the at least one extrinsic parameter, and
   deriving a rotation around a second horizontal axis from the derived orientation of the camera with respect to the ground plane.

6. The method according to claim 1 comprising:
   deriving a magnitude of a shape parameter of a calibration marker image,
   comparing the magnitude of the shape parameter with a magnitude of a corresponding stored shape parameter, and
   deriving a mounting height of the at least one camera from the comparison of the magnitudes.

7. The method according to claim 1 comprising:
   deriving a magnitude of a shape parameter of a first calibration marker image from image data of a first vehicle camera,
   deriving a distance between the first vehicle camera and the corresponding calibration marker,
   deriving a magnitude of a shape parameter of a second calibration marker image from image data of a second vehicle camera,
   the first calibration marker image and the second calibration marker image corresponding to the same calibration marker,
   deriving a distance between the second vehicle camera and the corresponding calibration marker, deriving a position of the corresponding calibration marker on the ground surface with respect to a vehicle coordinate system using the first distance and the second distance, deriving a rotation of the first vehicle camera around a vertical axis from the derived position of the corresponding calibration marker, and deriving a rotation of the second vehicle camera around the vertical axis from the derived position of the corresponding calibration marker.

8. The method according to claim 7, comprising deriving a rotation of the first vehicle camera around a first horizontal axis from the derived position of the corresponding calibration marker.

9. The method according to claim 7, comprising deriving a rotation of the first vehicle camera around a second horizontal axis from the derived position of the corresponding calibration marker.

10. The method according to claim 1, wherein the image data comprises two or more calibration marker images, comprising:

deriving a camera orientation of the at least one camera for each of the two or more calibration marker images, and computing an average camera orientation as a weighted average of the derived camera orientations of the at least one camera.

11. The method according to claim 1, wherein the calibration markers are selected from one or more painted surfaces and one or more portable boards.

12. A non-transitory computer readable storage medium, storing a computer program for the execution of a method according to claim 1.

13. A vehicle computation unit, comprising:

a computer readable memory, the computer readable memory comprising stored pre-determined shape parameters of a set of separate calibration markers, wherein the calibration markers have respective perimeters in a shape that is common between the separate calibration markers, the separate calibration markers are manually placed at random locations and random orientation angles with respect to the respective perimeters on a ground surface relative to each other and relative to the placement of the vehicle;

a processor; and a connection for receiving image data from one or more vehicle cameras, the image data comprising a video sequence, the video sequence comprising calibration marker image data captured over a period of time while the vehicle is driven towards and over at least one of the separate calibration markers, wherein the processor is configured to:

detect marker boundaries in the image data, match the detected marker boundaries to the pre-determined shape parameters, identify each of the separate calibration markers, track the identified separate calibration markers in the video sequence captured over the period of time while the vehicle is driven towards and over at least one of the separate calibration markers, derive at least one extrinsic parameter of the at least one vehicle camera using the positions of the identified separate calibration markers in the video sequence captured over the period of time while the vehicle is driven towards and over at least one of the separate calibration markers, the at least one extrinsic parameter of the at least one vehicle camera including at least one rotation about at least one axis, and calibrate the at least one vehicle camera by adjusting the at least one rotation to attain an optimum rotation about the at least one axis.

14. The method according to claim 8, comprising deriving a rotation of the first vehicle camera around a second horizontal axis from the derived position of the corresponding calibration marker.

* * * * *